Patented Feb. 3, 1942

2,271,877

UNITED STATES PATENT OFFICE 2,271,877

FRACTIONATED STARCH NITRATE

Walter O. Snelling and George E. Rees, Allentown, Pa., assignors to Trojan Powder Company, Allentown, Pa.

No Drawing. Application March 15, 1939, Serial No. 262,066

7 Claims. (Cl. 260—235)

This invention relates to starch nitrate solutions and the method of making the same. More particularly, the invention relates to coating compositions, of the lacquer or varnish type, containing starch nitrate of such solubility characteristics that it is not precipitated when the compositions are warmed.

In previous attempts to use starch nitrate in a volatile solvent medium as lacquer, for instance, there has been difficulty due to insoluble material in the solution, this insoluble material appearing as a haze in the finished lacquer film. Also, it has been necessary to use relatively expensive solvent mixtures including large proportions of esters and like materials.

It is an object of the invention to prepare a solution containing starch nitrate that is free from objectionable haze and that may be used to form a practically clear lacquer film. Another object is the provision of starch nitrate that may be dissolved in a comparatively inexpensive solvent medium. A further object is the fractionation of starch nitrate, to obtain a portion of such solubility as to avoid precipitation on warming a solution of the starch nitrate. Other objects and advantages of the invention will appear from the description that follows.

Briefly stated, the invention comprises the product resulting from and the method of dissolving starch nitrate in part in a cold solvent medium of kind to be described, separating the resulting solution from that part of the starch nitrate which fails to dissolve, warming the solution, and then separating the fraction of the starch nitrate that is precipitated during the said warming. The invention also comprises lacquers containing a volatile solvent medium, preferably one containing a large proportion of a lower aliphatic alcohol, and a starch nitrate product that remains substantially completely soluble in the solvent medium at all temperatures up to that of normal use of the lacquer.

In the preferred practice of the invention, starch nitrate is dissolved in part in cold methanol, the undissolved or insoluble fraction of the starch nitrate separated, as by filtration, the solution so obtained warmed to a temperature at least as high as that of normal use of the solution, to form a precipitate of starch nitrate, and the precipitate which forms on warming is separated, as by a second filtration. The solution finally obtained is substantially free from haze and may be made into a lacquer which gives a film as clear as required in common lacquer practice.

It will be noted that the starch nitrate is thus separated into three fractions. The fraction which remains undissolved initially is insoluble in cold methanol. The fraction which separates from the solution on warming is soluble in cold but insoluble in warm methanol. The third fraction is soluble in methanol either cold or warm and constitutes the major part of the starch nitrate.

The invention will be illustrated by description in greater detail in connection with the following specific examples.

Thirty parts of starch nitrate are mixed with sufficient methanol of usual commercial grade to make 100 parts of the mixture, proportions here and elsewhere herein being expressed as parts by weight, unless otherwise stated. The mixture is then agitated, either continuously or at frequent intervals, until practically no more starch nitrate dissolves. This agitation may be effected at atmospheric temperature or lower. Thus, we have used to advantage agitation at intervals for 24 hours, at a temperature of approximately —20° C. Preferably, the solution so made is allowed to stand for a considerable time, before the insoluble material is separated, as will be explained later.

This separation is made by filtration or centrifuging. In making the filtration, for instance, there has been used a high speed diatomaceous earth filter-aid (Hyflo Super-Cel) and the filtration has been made under pressure, through tissue paper supported on a wire gauze and overlain by a thin sheet of silk, the temperature of filtration being not substantially above atmospheric, advantageously, about —15° C.

The solution thus separated from the original insoluble fraction of the starch nitrate is warmed to a temperature at least equal to that of normal use of the starch nitrate solution, the term "use" including storage or shipment.

In a typical operation, the clear filtrate was warmed to 50° C., to cause precipitation of a fraction of the starch nitrate that is insoluble in hot methanol although soluble in methanol of the temperature at which the filtration described above was made.

The fraction precipitated on warming is then separated as before, as by filtration with a filter-aid in a pressure filter.

It has been found that the major part of the starch nitrate dissolves in the cold methanol and that a fraction of appreciable size separates or precipitates on warming the methanol solution. For example, approximately 80 per cent of a nitrated cassava starch containing about 13 per cent nitrogen dissolved in cold methanol as solvent and passed through the filter; about 5 per cent or more of this starch nitrate precipitated from the filtered solution on warming to 50° C.

For the surprising results obtained in the treatment of starch nitrate with the methanol at various temperatures, no explanation is offered as being certainly correct. Also, the invention is not limited to any theory to account for the results. A possible explanation may reside in inner incompatibility, one fraction of starch nitrate unless separated possibly causing precipitation of another fraction of starch nitrate of different solubility characteristics.

There may be made various modifications of the general method illustrated by the preceding example.

The proportion of starch nitrate may be varied, as for instance, from 15 to 50 parts to 100 parts of the mixture of the nitrate and solvent, the exact proportion or concentration of the solution to be made depending largely upon separation equipment available. The concentration should not be made so high as to introduce insurmountable difficulties in separation of undissolved material by centrifuging or filtering. On the other hand, concentrations of solution corresponding to less than 15 parts starch nitrate to 100 parts total are not the most desirable commercially because of the high ratio of solvent to the film forming starch nitrate. A concentration of about 25 per cent, that is, 25 parts of dissolved starch nitrates to 75 parts of solvent medium is preferred.

In place of the methanol there may be used ethanol.

In any case the alcohol should be substantially anhydrous, that is should contain not more than 1 per cent to 2 per cent of water and preferably should contain less than 1 per cent of water. We have found that the dissolving power of the lower aliphatic alcohols for starch nitrate decreases rapidly as the percentage of water present increases. Ordinary denatured ethanol containing approximately 8 per cent of water by weight dissolves only about 2 per cent of starch nitrate, whereas anhydrous ethanol dissolves approximately 60 per cent of starch nitrate under comparable conditions.

The solubility of starch nitrate in methanol of a given water content is much higher than in ethanol. Methanol is therefore preferred as the alcohol to be used. Isopropyl and higher alcohols are not satisfactory for the present purpose.

The methanol used as solvent for the fractionation may be mixed with a certain proportion of non-solvent or solvent material of kind commonly used in lacquer solvent formulas. Thus, the methanol may be blended with benzene, toluene, cleaner's naphtha or like low boiling petroleum distillate, butyl acetate, amyl acetate, a butyl or amyl alcohol, and other lacquer solvents or diluents, the methanol preferably constituting at least a third to one half of the total of volatile materials.

If desired, the temperature of the solution of starch nitrate may be adjusted before the first filtration, for the separation of initially insoluble material, to a temperature at least as high as that to which the resulting solution will be subjected during normal use. Proceeding in this manner, the first filtration may be made, at atmospheric temperature and, preferably, somewhat thereabove, say at 40° to 50° C., so that substantially all starch nitrate which passes in dissolved or dispersed condition through the filter will remain suspended during normal use. Care is taken to prevent excessive loss of volatile solvent from the filtrate. Thus the filtration may be made in a system that is practically closed against loss of solvent vapor.

The fraction of starch nitrate that is soluble in both the warm or cold solvent media, of the kind described, is particularly useful in the preparation of coating compositions of which lacquer is an example.

In making lacquer, the solution of starch nitrate which has been filtered at a temperature at least as high as that of normal use of the material, including storage, shipping, or spraying temperatures, is blended with selected resins and volatile solvent ingredients. A satisfactory lacquer has been made of the following formula:

*Lacquer*

| Ingredients | Parts by weight |
| --- | --- |
| Starch nitrate (soluble in both cold and warm methanol) | 10 |
| Shellac (50% solution of bone-dry bleached wax-free shellac in methanol) | 20 |
| Methanol in addition to that in the shellac solution | 30 |
| Toluene | 20 |
| Butanol | 15 |
| Tricresylphosphate | 5 |
| Total | 100 |

The lacquer made as described and poured on a surface to be coated gives a film that is clear and free from any objectionable cloudiness or haziness.

Variations may be made from the typical lacquer formula given.

The proportion of resin to starch nitrate may be varied. For best results, however, the proportion of resin by volume should be at least equal to that of the starch nitrate, both being calculated on the solvent-free basis. Used in such a proportion, the resin overcomes the brittleness which is experienced when starch nitrate is used in lacquer in a larger proportion by volume. On the other hand, the proportion of starch nitrate should be appreciable, say at least 10 to 25 per cent of the volume of the resin, in order to produce a lacquer that dries relatively rapidly and gives a film that is not excessively brittle or chalky, is resistant to whitening on exposure of the film to water, and is satisfactorily tough.

While the plasticizer may be omitted, it is necessary for best results, especially when the proportion of starch nitrate to resin is near the larger of the limits given above. As plasticizer, there may be used not only tricresylphosphate but also dibutyl or diamyl phthalates or other plasticizers that are commonly used in proxylin lacquers, either alone or intermixed. The proportion of plasticizer may be varied according to the degree of softness desired in the film, say from 5 to 25 parts to 100 parts of resin and starch nitrate.

The shellac in the above formula may be replaced by other common lacquer resins that are soluble in the solvent media at all stages of its evaporation, such, for example, as spirit soluble pontianak or Manila copal. When the thinner contains a rather large proportion of toluene, benzene, or equivalent from the standpoint of dissolving power for resins, there may be used ester gum, modified alkyd resins, or the like.

The composition of the medium constituting the lacquer solvent mixture may be varied to include conventional lacquer solvent ingredients, in amounts adequate to give smoothness of lacquer film and resistance to blushing. Thus there may be incorporated substantial amounts of butyl or amyl acetate, butyl or amyl alcohol, ethylene glycol monoethyl ether or its acetate, and the like. However, it is preferred to use a solvent formula including a large proportion, say 15 to 60 per cent, of the substantially anhydrous lower alcohols, particularly, methanol. The esters and higher boiling alcohols may well compose 30 to 50 per cent of the solvent mixture. Hydrocarbon diluents may compose as much as 30 to 55 per cent of the solvent medium.

In addition to the use described above for the major fraction of the starch nitrate, the fraction of the said nitrate that is insoluble initially in cold methanol, as well as the fraction which precipitates on warming, may be treated with lacquer solvent media containing a somewhat larger proportion than usual of active solvents, such as esters or ketones. Solutions so formed may be blended with resins and other conventional lacquer ingredients to make coating compositions that are satisfactory for purposes not requiring a high degree of clarity of the coating film.

Special advantages have been found when the lower aliphatic alcohol used to dissolve the starch nitrate initially is blended with a volatile hydrocarbon diluent. Blends of the substantially anhydrous ethanol or methanol with toluene, xylene, or a low boiling petroleum distillate, such as gasoline, have the property of dissolving a larger proportion of starch nitrate than may be dissolved in the alcohols alone. The extent of this advantage is indicated by the following data for solubility of nitrated cassava starch containing 13.2 per cent nitrogen, one part by weight of the nitrate being used in the test for four parts of the solvent:

| Solvent used | Percentage of starch nitrate dissolved | |
| --- | --- | --- |
| | At −23° C. | At 50° C. |
| Anhydrous ethanol | 61 | 33 |
| Methanol | 78 | 57 |
| Methanol 75%, benzene 25% | 59 | 45 |
| Methanol 75%, toluene 25% | 97 | 83 |
| Methanol 40%, toluene 60% | Not determined | 89 |
| Methanol 75%, U. S. motor gasoline 25% | 94 | 35 |

There is considerable experimental error possible in these determinations. The figures given, however, are to be considered as correct to the extent of showing the superiority of alcohol-hydrocarbon blends over the straight alcohols in dissolving starch nitrate.

Solutions made with mixtures of the alcohol and volatile hydrocarbon are useful, in the manufacture of lacquer, as described above. The solution of starch nitrate made in a mixture of methanol with gasoline and filtered subsequent to warming to 50° C. or higher, for instance, is compatible with pyroxylin solutions. This result is contrary to all previous experience in which it has been found that solutions made with both starch nitrate and pyroxylin separate into two layers unless a special homogenizing agent is used.

In making a solution of starch nitrate to be blended with pyroxylin, the proportion of gasoline used should be substantial; for this purpose we have used to advantage a solvent mixture containing for each 1 part of gasoline about 3 to 5 parts of methanol. In typical successful solutions the pyroxylin used was of the regular solubility type and of 5 to 7 seconds viscosity by the falling ball method and was used in the proportion of about 25 to 60 parts to 100 parts of total weight of starch nitrate and pyroxylin, both calculated to the dry basis. Actually the pyroxylin used was in the form of an alcohol-wet mixture including about 70 parts of pyroxylin to 30 of alcohol. Other grades of cellulose nitrate may be used, particularly pyroxylin of half second or quarter second grade.

While the invention is not limited to a particular period of time during which the initial solutions made as described herein are to be allowed to stand before insoluble material is separated, we have found a surprising effect of time of standing upon clarity of solution. When methanol, ethanol, or a mixture thereof with a volatile hydrocarbon diluent is agitated with starch nitrate, there is produced in the course of a few minutes a relatively clear solution, with no large amount of the starch nitrate appearing to remain undissolved. As the solution stands, say at atmospheric temperature, there is a gradual change with progressive increase in the appearance of undissolved material. The solution becomes slightly turbid within about 10 minutes and almost completely opaque at the end of a half hour. The precipitation seems to continue for at least an hour, after which time the mixture is so opaque that further change is not readily noted. In order to permit the precipitation to become complete, we allow 24 hours before the solution is separated from the undissolved material.

It is to be understood that, in place of the nitrated cassava starch of the examples above, there may be used other nitrated starch or starches, as for example, nitrated starch from potato, corn, or the like.

It will be understood also that the details given are for the purpose of illustration, not restriction, and that variations within the spirit of the invention are intended to be included in the scope of the appended claims.

We claim:

1. In fractionating starch nitrate, the method which comprises dissolving starch nitrate in part in a solvent mixture consisting largely of hydrocarbon diluent and substantially anhydrous methanol and separating the resulting solution from the undissolved material at a temperature of approximately 50° C.

2. In fractionating starch nitrate, the method which comprises dissolving starch nitrate in part in a solvent medium containing a large proportion of a substantially anhydrous alcohol selected from the group consisting of methyl and ethyl alcohols, separating the resulting solution from undissolved material at a temperature not substantially above atmospheric, then warming the solution to about 40° to 50° C. to cause precipitation of a portion of the starch nitrate and leave in solution the major part of the starch nitrate, and filtering the precipitated material from the solution.

3. In fractionating starch nitrate, the method which comprises dissolving starch nitrate in part in a solvent medium containing a large proportion of substantially anhydrous methanol, separating the resulting solution from undissolved material, then warming the solution to about 40° to 50° C. to cause precipitation of a portion of the starch nitrate and leave in solution the major part of the starch nitrate, and separating the precipitated material from the solution.

4. In fractionating starch nitrate, the method which comprises dissolving starch nitrate in part in a solvent medium containing a large proportion of a substantially anhydrous alcohol selected from the group consisting of methyl and ethyl alcohols and filtering the solution from undissolved material at a temperature of about 40° to 50° C., the solution as filtered containing the major part of the starch nitrate.

5. The method described in claim 2, the solvent medium including a large proportion of a hydrocarbon diluent and the mixture resulting from dissolving the starch nitrate in the solvent medium being caused to stand for a substantial period of time at approximately atmospheric temperatures before the undissolved material is separated from the resulting solution at a temperature not substantially above atmospheric.

6. In fractionating starch nitrate, the method which comprises dissolving starch nitrate in part in a solvent medium containing a large proportion of a substantially anhydrous alcohol selected from the group consisting of methyl and ethyl alcohols, separating the resulting solution from undissolved material at a temperature not substantially above atmospheric, then warming the solution to cause precipitation of about 5 per cent of the starch nitrate and leave in solution the major part of the starch nitrate, and separating the precipitated material from the solution.

7. In fractionating starch nitrate, the method which comprises dissolving starch nitrate largely in a solvent medium containing a large proportion of a substantially anhydrous alcohol selected from the group consisting of methyl and ethyl alcohols, warming the solution, so as to cause precipitation of a minor portion of the starch nitrate originally dissolved and leave in solution the major part of the starch nitrate, and separating the said solution from insoluble material, the starch nitrate left in solution giving in the said solvent a solution that is substantially clear.

WALTER O. SNELLING.
GEORGE E. REES.